United States Patent
Vogel et al.

(10) Patent No.: US 7,526,653 B1
(45) Date of Patent: Apr. 28, 2009

(54) METHOD OF DATA PROTECTION

(75) Inventors: Kolja Vogel, Bielefeld (DE); Stephan Beinlich, Munich (DE); Ullrich Martini, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 802 days.

(21) Appl. No.: 10/049,632

(22) PCT Filed: Aug. 4, 2000

(86) PCT No.: PCT/EP00/07597

§ 371 (c)(1),
(2), (4) Date: Jun. 13, 2002

(87) PCT Pub. No.: WO01/15378

PCT Pub. Date: Mar. 1, 2001

(30) Foreign Application Priority Data

Aug. 25, 1999 (DE) ................................. 199 40 341

(51) Int. Cl.
*H04L 9/00* (2006.01)
*G06K 9/00* (2006.01)

(52) U.S. Cl. ...................................... 713/186; 382/115

(58) Field of Classification Search ........................ None
See application file for complete search history.

(56) References Cited

U.S. PATENT DOCUMENTS

| 4,202,626 | A | | 5/1980 | Mayer, Jr. et al. |
| 5,131,038 | A | | 7/1992 | Puhl et al. |
| 5,228,094 | A | | 7/1993 | Villa |
| 5,708,667 | A | | 1/1998 | Tomohiro |
| 5,991,408 | A | * | 11/1999 | Pearson et al. .............. 713/186 |
| 6,075,987 | A | * | 6/2000 | Camp et al. ................. 455/427 |
| 6,185,316 | B1 | * | 2/2001 | Buffam ...................... 382/115 |
| 6,279,133 | B1 | * | 8/2001 | Vafai et al. .................. 714/763 |
| 6,697,947 | B1 | * | 2/2004 | Matyas et al. ............... 713/182 |
| 2002/0124176 | A1 | * | 9/2002 | Epstein ....................... 713/186 |

FOREIGN PATENT DOCUMENTS

| DE | 4243908 | 6/1994 |
| DE | 4413678 | 5/1995 |
| DE | 19631484 | 3/1998 |

(Continued)

OTHER PUBLICATIONS

Davida, Frankel, Matt, "On enabling secure applications through off-line biometric identification" 1998 IEEE Symposium on Security and Privacy, May 3-6, 1998, XP002154556, Oakland, USA.

(Continued)

*Primary Examiner*—Brandon S Hoffman
(74) *Attorney, Agent, or Firm*—Bacon & Thomas, PLLC

(57) ABSTRACT

A method is described for identifying and initializing digitized biometric features to provide encryption or coding of secret data.

26 Claims, 6 Drawing Sheets

FOREIGN PATENT DOCUMENTS

| | | |
|---|---|---|
| DE | 19702049 | 5/1998 |
| DE | 19744786 | 7/1998 |
| DE | 19715644 | 10/1998 |
| EP | 0763802 | 3/1997 |
| EP | 0867827 | 9/1998 |
| WO | WO 98/52317 | 11/1998 |
| WO | WO 99/26187 | 5/1999 |
| WO | WO 99/26372 | 5/1999 |
| WO | WO 99/33213 | 7/1999 |
| WO | WO 99/33219 | 7/1999 |
| WO | WO 99/34554 | 7/1999 |

OTHER PUBLICATIONS

Marc-Bernd Woop and Rene Baltus: Research and Development: Biometric Identification In: "Funkschau", No. 20/97, pp. 64-65.

Harald Seiffert, Biometrische Verfahren, In: IK, Berlin 48, 1998, pp. 13-15.

* cited by examiner

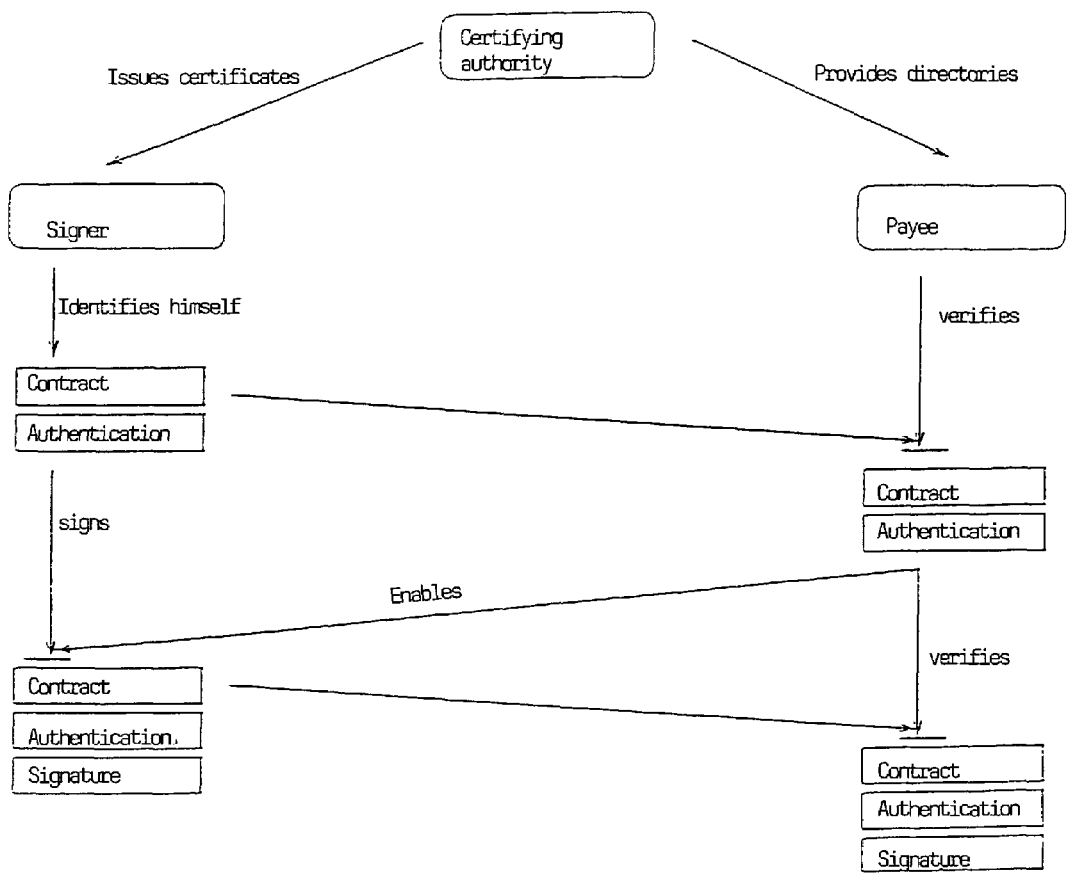

Figure 6

| Possibility of attack | Countermeasure |
|---|---|
| Cryptanalytic attacks (KA) | Asymmetric cryptography |
| Brute-force attacks (BFA) | Choosing suitable key lengths |
| Tamper (TA) | Tamper-proofed or -resistant hardware |
| Corrupting trust model (TMA) | Choosing transparent trust model |
| Corrupting user (UA) | Transparence |
| Man-in-the-middle attacks (MMA) | Not transferring security-critical data over network |
| Replay attacks, fake-terminal attacks (RA) | Not transferring security-critical data over network |
| Theft of private signature key (PKT) | Protecting key (by password, PIN or biometry) |
| Theft of stored prototype of biometric feature (STT) | Not storing prototype |
| Exchange of stored prototype of biometric feature (STX) | Protecting prototye, not storing prototype |
| Cryptanalytic attacks on stored PIN (KAP) | Choosing suitable encryption method |

METHOD OF DATA PROTECTION

BACKGROUND

This invention relates to the protection of data, in particular a method for guaranteeing authenticity and integrity of digitized data on the basis of biometric features.

In the course of increasing globalization in almost all areas of the economy, particularly new information technologies are of ever greater importance. This primarily applies to the progressive use of electronic communication networks, the best known form presumably being the Internet. The increasing international exchange of goods and services makes it absolutely necessary for information to be transmitted safely. At present, the value of monetary transactions many times exceeds that of the exchange of goods. This data traffic is handled at present in some form over electronic communication networks (e.g. electronic transactions such as e-commerce). This form of communication, as in the nonelectronic sphere, involves the need for the parties to the transaction to be able to rely on statements (in particular declarations of intention) during the transaction both on the content and on the identity of the other party. Since such electronic transactions (on-line transactions) normally involve no direct contact of the parties and the data are only present in electronic form, however, this cannot be achieved by face-to-face interaction as usual otherwise. Without the possibility of authentication and protection of transaction data against manipulation, realization is inconceivable. A reliable check of data integrity is also of great importance with respect to the protection of electronic stored personal data. Digital signatures are one way of ensuring the authenticity and integrity of data. Only authorized persons, groups or machines can make changes on data. Additionally, anyone can ascertain whether a signature is authentic.

Known signature methods use a so-called asymmetric encryption method. The basic course of such a method will be outlined in the following.

For each participant in the signature system a key pair is generated, for example a secret and a public key, which have a certain mathematical relationship to each other. To generate the digital signature the sender uses his secret key, normally as a special signature feature. The document to be signed is first compressed by a so-called hash method, the resulting digest linked with the secret key according to a predetermined algorithm and the result appended to the document to be transferred as a digital signature. The recipient now likewise compresses the document and compares this digest with the digest contained in the digital signature which results by decrypting the signature with the sender's public key. In case of a match it is certain that the sent and received texts are the same, i.e. there have been neither manipulations nor transfer errors. It is also certain that only the sender, who is in the possession of the secret key, can have generated the signature because the public key would otherwise not "fit," i.e. no transformation to the original digest could have taken place.

The security of modern signature methods is based on the fact that the private signature key cannot be determined according to the current level of knowledge even if the plaintext, the signed text and the affiliated public signature key are available to the attacker. An example of an asymmetric encryption method is RSA. The RSA method was named after its developers: Ronald L. Rivest, Adi Shamir and Leonard Adleman, who presented the method in 1977 ("On Digital Signatures and Public Key Cryptosystems," MIT Laboratory for Computer Science Technical Memorandum 82, April 1977) and in 1978 ("A Method for Obtaining Digital Signatures and Public-Key Cryptosystems," Communications of the ACM 2/1978). RSA is based on number-theory considerations, it being assumed that large numbers are difficult to factorize, i.e. resolve into prime factors. This is the so-called factorization problem. The assumed computing effort is so great that the encryption can virtually not be broken by a brute-force attack if the keys are suitably chosen. No cryptanalytic attacks are published.

Thus, such an asymmetric encryption method permits a signed document to be associated uniquely with a signature key. The association of a signed document with a person or organization is still problematic, however. For it to succeed, the following conditions must be guaranteed. Firstly, only the rightful owner has access to his private signature key and, secondly, each public key has the rightful owner of the affiliated private key associated therewith in unique fashion.

To meet the first condition there is the possibility of identifying the rightful owner of the signature key by biometric features.

To meet the second condition many systems include so-called trusted third parties: third parties who are not directly involved in the transaction and whose trustworthiness can be considered certain. The system of mutual trust and checks is frequently called the trust model.

Examples of the use of signature methods for authentication and checking data integrity are: contracts concluded electronically over the Internet or another data network; electronic transactions (cf. e-commerce); controlled access to resources (e.g. data connections or external memory systems); process control data which are exported and read into production plants; personal data management (e.g. patient data management or in government agencies).

As with every security system, there are numerous possibilities of attack with signature methods known today. These are presented in a table in FIG. 6.

Known signature systems are for example so-called smart card systems. Many systems based on smart cards offer good protection against attacks on the key itself (cryptanalytic attacks), brute-force attacks (BFA) and attacks on the hardware on which the key is stored. However, replay and fake-terminal attacks (RA) as well as attacks on the users are relatively promising, i.e. smart card systems are a security risk with respect to such attacks.

Some systems attempt to protect users from theft of the signature key. Both PINs and biometric methods are employed. Attacks on the trust model (TMA) are not even discussed by most providers of authentication systems.

In the following, a conventional system combining digital signatures and the measurement of biometric features shall be described. Both the customer's private signature key and a sample or prototype (the so-called template) of the digital representation of the measured biometric feature are present in stored form. The following specific authentication steps are taken. The user identifies himself, for example by entering a PIN or by a biometric feature being read. The biometric data are validated by comparison with a template. If the distance of the measured feature from the prototype is smaller than a threshold value, the transaction is enabled. This comparison is effected in readers or a central clearinghouse. In the latter case the biometric data—encrypted or in plaintext—are transferred over networks. The private signature key is released. The user identifies himself by signing the document digitally. The RSA method or another asymmetric encryption method is usually implemented. It is frequently implemented on a smart card or other tamper-resistant hardware. The signed hardware. The signed document is transferred over a network. The cryptographic operation is validated by means of the user's public signature key.

The security of said methods is based on the private signature key not leaving the smart card. "Man in the middle" attacks (MMA) on the private signature key itself are thus impossible as long as the smart card remains in the legitimate owner's hands.

An example of a method wherein both the customer's private signature key and a prototype of the digital representation of the measured biometric feature are present in stored form can be found in WO 09912144 A1.

The method proposed in WO 09912144 A1 provides that the template is present in stored form in a central clearinghouse. The latter digitally signs in the user's name if the distance of the measured biometric feature from the prototype is smaller than a threshold value.

However, the method proposed in WO 09912144 A1 has the disadvantage that it inherently involves some security problems. Firstly, the user must trust the reader into which the biometric feature is read, the clearinghouse and the public networks. Fake-terminal attacks are thus possible. Then the digital representation of the biometric feature can be read into the reader (so-called replay attack (RA)). Secondly, attacks on the reader or on the entity in which the template is stored (SKT) are also possible. Such attacks are aimed at reading the template of the digital representation of the measured biometric feature. Such attacks can also be performed online (MMA). Thirdly, the data associated with the template of the digital representation of the measured biometric feature can be exchanged (STX).

WO 09850875 describes a so-called biometric identification method using a digital signature method and biometry. This method prevents the template of the digital representation of the measured biometric feature from being exchanged (STX) by storing it in a so-called biometric certificate. The template, as well as user data associated therewith, are validated and digitally signed by a certifying authority. This prevents the user data associated with the template from being exchanged. However, the disadvantage is that this cannot exclude the possibility of replay attacks.

WO 98/52317 likewise describes a digital signature method. The method according to WO 98/52317 attempts to thwart STT and STX attacks by doing without storage of the digital representation (template) of the biometric feature (BM). In an initialization phase the BM is used to create a so-called instance, i.e. representative or specific example of a class, of a problem whose solution is the BM. The digital representation is thus not explicitly stored, but hidden in the instance of the problem. WO 98/52317 proposes designing the problem so that the digital representation is hidden in a mass of similar data (camouflage).

The capture of a biometric feature for further computer-aided processing presupposes analog-to-digital conversion, which will often yield rounding errors in the digitized measured values since the resolving power is always finite, albeit very exact. Furthermore, it is unrealistic to assume that the user will always adopt exactly the same positions with respect to the measuring sensor system when biometric features are captured. Measurements of behavioral biometric features involve the additional problem that the user cannot be expected to exactly replicate his behavior twice. However, the point of using biometric features is precisely their absolutely unique association with a person (e.g. fingerprint, retina, etc.). Therefore, information about the necessary fault-tolerance or about how the varying measured values are to yield a unique association is imperative. WO 98/52317 provides no information about how great the fault-tolerance of this method is. It likewise remains unclear how great the amount of camouflaging information must be for the solution to the problem not to be read. This is a necessary condition for quantifying or even just estimating the security of the method.

DE 4243908 A1 attempts to prevent PKT, TA, STT and STX attacks by doing without storage of the private signature key and without storage of the digital representation of the biometric feature. This is done in the following way. Biometric feature ABM is measured. Biometric feature ABM is digitized. From the digital representation of the biometric feature a so-called fixed-length individual value IW is calculated. From individual value IW the sender's private signature key SK(A) is calculated. The message is encrypted by means of said key SK(A).

However, it is disadvantageous that the calculation of IW is to be done by means of function f, which has a certain fault-tolerance, since it is unclear how this fault-tolerance, which is of crucial importance, is to be determined for such a function. The application requires merely that it assign the same individual value to two users "only with such low probability as is compatible with the security of the system." It is likewise disadvantageous that it is unclear which functions or classes of functions are to have the properties required in the application. The description of the application instead permits the conclusion that, although collision freedom is required for function f, i.e. it should be impossible to find two input values for the same function value, it is nevertheless to have a certain fault-tolerance. Such a function having these diametrically opposed conditions can by definition not exist. The result of this is that invariably reproducible generation of the same private key from new measured values of the same biometric feature is not possible free of doubt, i.e. signed documents or data cannot be identified or authenticated with known public keys.

US005832091A describes a method for obtaining a unique value from a fingerprint. This method works as follows. In a first step the fingerprint is Fourier transformed. Then the Fourier coefficients are subjected to imaging which depends on the template of the fingerprint and the resolution of the measuring instrument. From the inverse transform a unique value is obtained from which a signature key can be determined. The method has the following disadvantages, however. The method works only for fingerprints, the method requires a Fourier transform, for the imaging dependent on the template it cannot be determined how much information about the template it reveals. Thus, it is not possible to quantify the security against brute-force attacks, and the method only corrects errors which are due to the resolving power of the measuring instrument. It remains unclear whether errors resulting e.g. from dirt or small injuries of the fingertips are also corrected.

All stated methods thus share the disadvantage of not permitting any quantitative statements about the computing effort of a brute-force attack and thus the protection from decryption. Thus, they are inaccessible to quantification of the protection by biometry.

SUMMARY

The invention is based on the problem of providing a method for protecting data that has increased security compared to prior art methods.

Further, it is a problem of the invention to provide a method permitting safe encryption of the signature key with the aid of biometric features.

A further problem of the invention is to provide a possibility of quantifying the protection of encryption by biometry in such a method.

These problems are solved by the features described herein.

According to the application the invention uses a signature method wherein the private or secret key (signature key) is encrypted with data obtained from a biometric feature of the owner of the private key. The encryption achieves a guarantee to the effect that the person who has given his digital signature with the aid of the signature key is in fact the rightful owner.

In a first step, a biometric feature of the owner of the signature key, preferably his handwritten signature, is provided in the authentication phase (verification). Measuring data are obtained from the biometric feature.

In a second step, the measuring data of the biometric feature are digitized for acquisition and further processing thereof.

In a third step, the signature key is recovered. The signature key is first decrypted on the basis of the biometric feature measured in the authentication phase, and then recovered on the basis of a coding-theory method. Alternatively, the biometric feature measured in the initialization phase can first be recovered on the basis of a coding-theory method from the biometric feature measured in the authentication phase. This then decrypts the signature key. The correction capacity of the error-correcting method is freely selectable, i.e. the original, fault-tolerant coded value is only recovered if the input of the error-correcting method does not deviate too far.

In the method according to the application, there is no storage at any point of secret data, i.e. the signature key and the digitized feature data or secret parts thereof, so that it is impossible to exchange or steal the prototype of the biometric feature. Therefore, this method according to the application guards against the following possibilities of attack:

KA by using an asymmetric encryption method;
PKT attacks are impossible since the signature key is not stored;
STT and STX attacks are likewise prevented since the digital representation of the biometric feature, or the relevant secret part thereof, is not stored.
MMA attacks are prevented since the biometric feature is not transferred over a data network.
In an advantageous embodiment, RA attacks are prevented by the biometric feature not being read into an external reader. In another advantageous embodiment presupposing external readers, RA attacks are impeded compared to the prior art since the method rejects two exactly identical digital representations of the biometric feature.

In one advantageous embodiment of an initialization phase (enrolment) to the authentication phase of the method according to the application, in one step the relevant biometric feature is accordingly digitized. In a further step, secret data are provided. In case of a public-key method the key generation necessary for an asymmetric signature method, i.e. the generation of a signature key, is effected. In a further step, the secret data are coded fault-tolerantly on the basis of a coding-theory method and encrypted on the basis of the biometric feature.

In another advantageous embodiment of the initialization phase, the secret data are first coded fault-tolerantly. The resulting code word is longer than the original message; the redundant information serves to decode a message in which some bits are flipped. The code word then is encrypted on the basis of the biometric feature.

In another advantageous embodiment, the code word is generated by the secret data being multiplied with a generating matrix. This is for example an efficient method for representing the space of allowed code words.

In another variant of the initialization phase, the secret data (message) are not changed by the coding. Instead, separate correction data are created. Said data describe the space of allowed code words.

In another advantageous embodiment of the authentication phase, the encrypted code word is first decrypted on the basis of the biometric feature. The encryption method is to have the property that single flipped bits have no influence on other bits. A suitable encryption method is the application of the bit-by-bit exclusive OR rule (XOR).

In a further variant of the initialization phase, separate correction data are created in dependence on the biometric feature.

In another variant of the authentication phase, separate correction data are first created in dependence on the biometric feature. In a further step, the biometric feature measured in the initialization phase is recovered. This is done on the basis of said correction data, i.e. the correction data created in the initialization phase and the biometric feature measured in the authentication phase. In a further step, the secret data are decrypted on the basis of the recovered biometric feature data.

In another embodiment, the correction data are created by calculation of parameters obtained from the biometric feature modulo n. On the basis of said data, values whose deviation from the true value is smaller than or equal to n are mapped onto the true value, while values whose deviation is greater than n are mapped onto a random value.

In another embodiment, the authentication correction data are created and calculation of parameters obtained from the biometric authentication feature modulo n. The biometric feature data are recovered by determining the difference of the residues. This is exactly the difference of the values when the deviation is smaller than n.

In another embodiment, the correction method is user-specific. This permits the correction capacity to be adapted to the variance of the biometric features within a user.

In another embodiment, the digitized feature is additionally broken down into a public and a nonpublic or secret part within the second step for providing a possibility of quantifying the effort of brute-force attacks and thus, if the system is suitably designed, a general quantification of the system with respect to protection by biometry. Since only the non-public part of the biometric feature is used for coding the signature key, the effort for a brute-force attack remains quantifiable.

In another embodiment, empirical inquiries are preferably used for breaking down the digitized biometric feature data since they are most easily performed at present.

In another embodiment, a hash value is preferably created with the aid of a hash function from the digitized biometric feature data or from the nonpublic portion thereof for coding the private key or signature key. This has the advantage of reducing the feature data to a fixed-length bit string and thus also simplifying the coding of the affiliated signature key, which can then be easily performed with an XOR operation for example.

In another embodiment, a hash value is still preferably created with the aid of a hash function from the digitized biometric feature data created in the authentication phase, said value being compared with already stored hash values of preceding authentications. Since the hash function is a special form of so-called one-way functions, it has the property of collision freedom. The term collision freedom is understood in cryptography to mean that similar but not identical texts are to yield completely different check sums. Each bit of the text must influence the check sum. This means, in simplified terms, that the function always yields exactly one identical output value of fixed bit length in case of identical input values. This property is exploited by the method according to the application, since it is virtually impossible to obtain exactly two identical measuring data records when the same biometric feature is repeatedly captured, as mentioned above. If comparison between the current and the stored hash values therefore leads to a positive result, this is a strong indication of the possibility that a replay attack is involved. Security can accordingly be guaranteed by aborting authentication.

The biometric features to be used for the method in question are preferably behavioral biometrics. These have the advantage of being difficult to imitate. Simple copying of patterns or features is virtually excluded.

In another embodiment, the method according to the application uses the handwritten signature as the behavioral biometric since it can be easily broken down into dynamic and static portions, which in turn serve to break down the biometric feature into secret and public parts.

In another embodiment, the handwritten signature is preferably broken down into a public and a secret part such that the secret part of the signature is a proper subset of the dynamic information, thereby making quantification possible or keeping it possible.

In another embodiment, the biometric feature in question is measured and digitized several times in order to improve the fault-tolerance or determination of variance of the biometric feature data when they are digitally captured.

In another embodiment, a conventional public-key method is preferably proposed for key generation since it is widespread and works reliably.

An apparatus is proposed for carrying out the method according to the application in a simple way.

The method according to the application thus permits the protection of data to an increased extent compared to the prior art. In addition the method according to the application permits coding or encryption of the signature key without creating new weak points for attacks on the signature method by storage of secret data. The method and apparatus according to the application furthermore permit safe authentication of persons or groups. The method according to the application furthermore makes it possible to determine from a biometric feature a reproducible value which can be used as the input for a cryptographic method, for example PIN or RSA. Also, the method and apparatus are fundamentally accessible to quantification for protection by biometry, i.e. estimation of the effort of a brute-force attack. Unlike the method according to the application, existing methods cannot exclude other attacks such as SST or STX, i.e. ensure that brute force is the best method of attack. Brute force is the only attack which is at all quantifiable, unlike e.g. theft of the biometric prototype or the like. If the secret portion of the biometric feature is at least as long as the signature key itself, an attack on the biometric feature requires at least as much effort as a brute-force attack on the signature key. This permits a numerical statement of the effort at least necessary for guessing the signature key with brute-force attacks. It is thus possible to quantify the security of the method according to the application, which uses a signature method with additional encryption of the signature key by biometry for protecting data.

BRIEF DESCRIPTION OF THE DRAWINGS

Further features and advantages of the invention can be found in the following description of an example with reference to the drawing, in which:

FIG. 3 shows a course of a conventional transaction using digital signatures and an additional authentication step;

FIG. 4 shows a schematic representation of the comparison of the correction data from the initialization and authentication phase according to the application;

FIG. 6 shows a table stating possibilities of attack and their countermeasures on digital signature methods additionally using biometry.

DETAILED DESCRIPTION

In the following, electronic transactions will be discussed as an example of application for the initialization and authentication method.

In electronic transactions it is of central importance that the identity of the parties to the transaction and the integrity of the transaction data can be clearly ascertained. There are different methods in use for authenticating the identity of the parties to the transaction.

In identification by knowledge, identification is effected by a shared secret, in practice usually a password, passphrase or PIN. In identification by possession, identification is effected via the signature key, personal identification card, etc. In identification by biometry it is done by fingerprint, retinal pattern.

Different combinations of said methods are likewise possible. Thus, someone making transactions with an ec card will identify itself by possession (the card) and by knowledge (the PIN).

Some authentication methods cannot meet high security requirements. Thus, identification by knowledge always involves the danger of users writing down the passphrase or PIN. Furthermore, passphrase or PIN can be determined cryptanalytically from stored data. To counteract such dangers, many new authentication methods use digital signatures. Digital signatures have a further advantage. They simultaneously ensure the integrity of the signed data: signature and data are inseparably interwoven.

Digital signatures stored on a smart card or another portable medium are only a special case of "identification by knowledge." Therefore, they are frequently protected additionally by a PIN or biometry.

Figure 2:
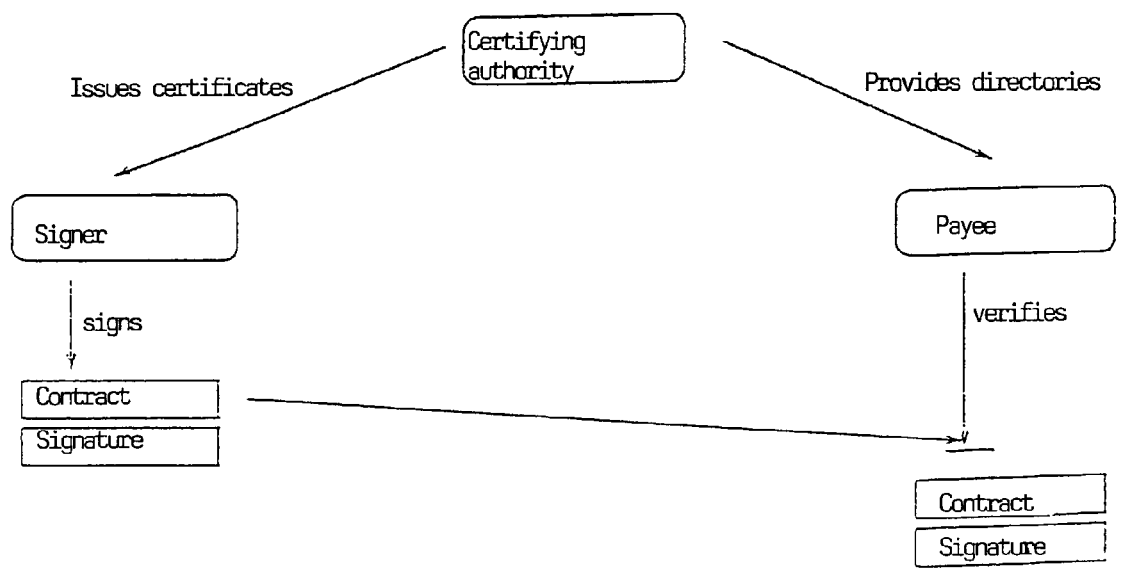
FIG. 2 shows a course of a conventional transaction using digital signatures.

FIG. 2 shows a conventional transaction using digital signatures. The transaction includes the following steps. A certifying authority issues certificates and keeps directories which assign a rightful owner to each digital signature. The signer signs a concontract. The payee validates the signature on the basis of the signer's public key. The payee might consult the directory kept by the certifying authority.

This form of transaction has several disadvantages. The payee is dependent on knowing the signer's public key; there is ultimately only an association of the payment with a private signature key, i.e. it is first unclear whether the rightful owner of the key is actually the person who signed the contract; and the customer and the payee must agree on a format.

Figure 1:
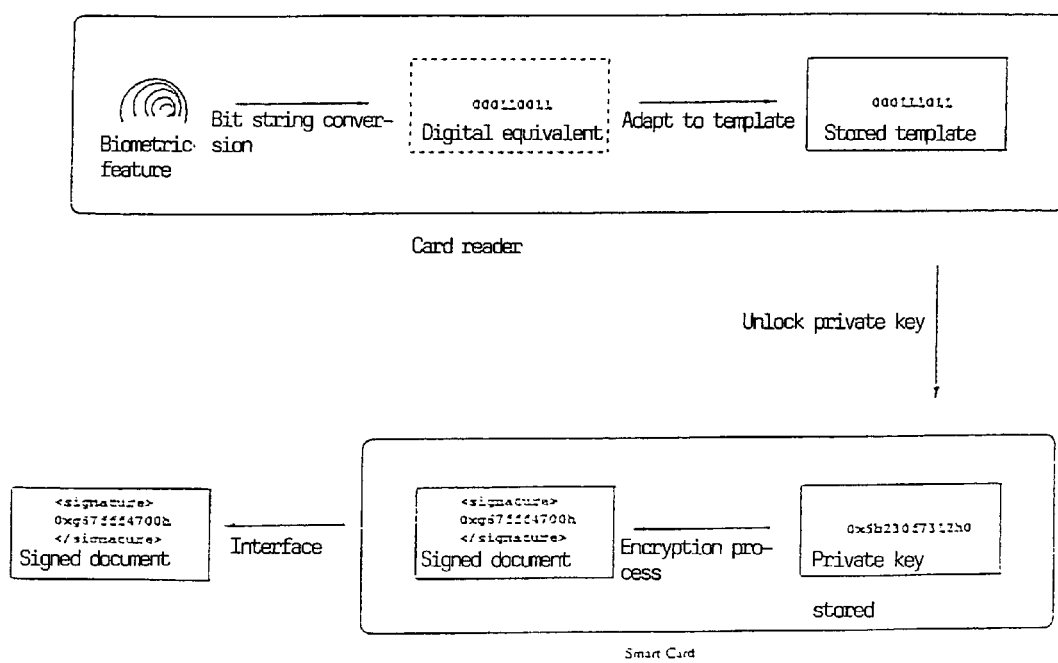
FIG. 1 shows a course of a transaction of a conventional smart card system using an authentication method with a digital signature.

In some methods, the customer can only sign the contract after previously identifying himself. The method then takes place as shown in FIGS. 1 and 3. In FIG. 1 data existing only temporarily are framed with dotted lines, and data existing for a longer time with continuous lines. FIG. 3 shows a conventional transaction with a digital signature and authentication. Authentication can be effected by measuring a biometric feature. The payee is dependent on knowing the signer's public key and a sample of the feature. It must be heeded that a digital representation of the measured biometric feature is transferred over a data network. Then the merchant side compares the measured biometric feature with a stored sample (template). In this connection attacks are possible, namely MMA, RA, STT, STX.

Figure 5:
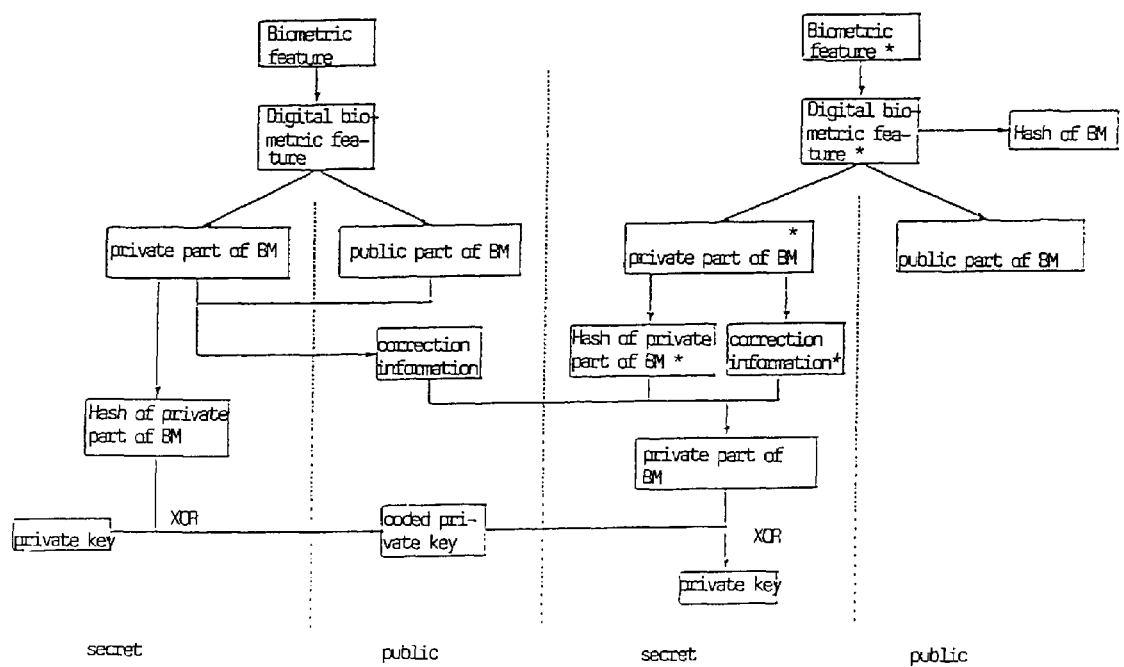
FIG. 5 shows a flowchart of the initialization and authentication phase according to the application.

FIG. 5 shows the signature method according to the application in a schematic flowchart. The two independent methods of the initialization and authentication phase are shown jointly. It includes the following steps. Firstly, in an initialization phase the user's biometric feature is measured and digitized. This is referred to as prototype P of the feature. The biometric feature might be measured several times. In this case, prototype P is determined from several measured values and used for initializing the apparatus. Ideally, prototype P is then broken down into a public and a secret part. On no account is a complete biometric feature, secret parts of a feature or a prototype thereof stored. Secondly, in a second initialization step correction data are calculated from prototype P to permit the reconstruction of measured biometric features when they are within a freely selectable tolerance interval. Thirdly, in a third initialization step the data necessary for carrying out the cryptographic method are calculated. Fourthly, in a fourth initialization step the private data of the cryptographic method are linked in suitable fashion with prototype P or parts of P. Fifthly, in the authentication phases the user's biometric feature is measured and digitized again. In the preferred embodiment embodiment the biometric feature is the user's signature, with dynamic characteristics of the signature being captured as well. The user can write his signature on the display of the apparatus. It is to be heeded that he is not asked to leave his biometric feature with "external" devices. This impedes theft of the biometric feature. Sixthly, the biometric feature is optionally broken down into a "classification part" and a "verification part." The "classification part" includes only publicly accessible information. If preliminary association of the biometric feature with a user on the basis of the information of the "classification part" fails, the user is rejected. The "verification part" includes only publicly inaccessible information. In the preferred embodiment this may be the dynamic characteristics of the signature. Seventhly, from the "verification part" or other information accessible only to the legitimate owner of the secret key, prototype P, or a value calculated therefrom, is reconstructed, being associated with the user in unique fashion. Collision freedom of the association rule with respect to different users is required. Eighthly, from this value—and optionally additional files—a fixed-length value is generated by means of a collision-free function, whose inverse function is difficult to calculate. An example of such a function is Message Digest 5 (MD5). This value serves as a starting value for determining the private signature key. Alternatively, the private signature key is determined directly from value P. Ninthly, the apparatus signs the bill or parts of the bill. The signature key is then immediately deleted.

In the following, the reconstruction of value P in the authentication phase will be described more exactly. An algorithm having the following properties is used for mapping onto value P: a) it maps legitimate input values, for example digitized biometric features, reliably onto value W. In the present case this is prototype P; b) it does not map illegitimate input values onto value W; c) it is scalable with respect to the allowed variance of legitimate values; d) the mapping function is discontinuous outside the interval in which the legitimate input values lie. This means that gradient methods are not applicable; e) it permits no conclusions on properties of legitimate input values.

Properties a), b) and c) describe the reliability of the method. Properties d) and e) say that analysis of the method for calculating value W offers no advantages to an attacker. This means that the effort of an attack on the system equals the effort of a brute-force attack. However, this only holds if the input values—for example parts of the biometric data—are not public.

The abovementioned requirements are fulfilled by the decoding stages of common error correction methods. The application of said methods presupposes that value W onto which mapping is to be done is coded redundantly in the starting value.

Figure 7:
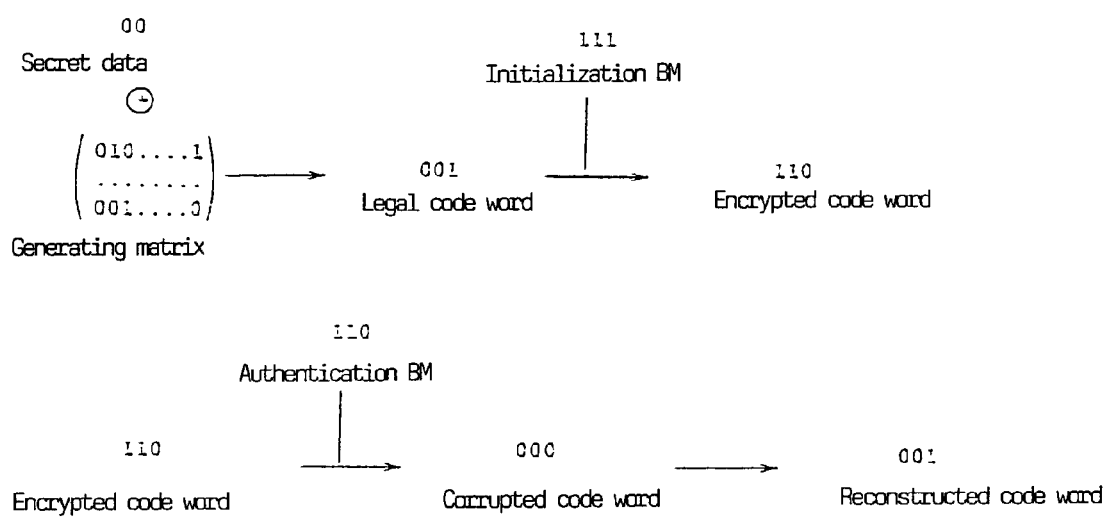
FIG. 7 shows the transfer of the coding and decoding stage of a coding-theory method to the correction of erroneous biometric features.

FIG. 7 shows the transfer of the coding and decoding stage of a coding-theory method to the correction of erroneous biometric features. The upper line shows the initialization phase. The lower line shows the authentication phase. In the initialization phase the secret data (e.g. the private key in a public-key method) are first mapped onto a legal code word by means of a generating matrix (or generating polynomial). The digitized biometric feature (initialization BM) encrypts said code word by the bit-by-bit XOR operation.

In the authentication phase (lower line), the encrypted code word is decrypted by a biometric feature measured at a later time (the authentication BM). Since the biometric authentication feature does not exactly match the biometric feature measured in the initialization phase, an erroneous code word results. This can be reconstructed by the decoding stage of the coding-theory method.

In the following, the signature method according to the application described above in principle will be described in detail with reference to a preferred example:

1. Initialization Phase
(a) In an initialization phase the legitimate user signs on a display of the apparatus several times.
(b) The signature is digitized. Static and dynamic information is detected.
(c) A sample or prototype P of the signature is calculated.
(d) The variance between the digitized signatures is determined.
(e) Static information of the signature is stored for classification purposes.
(f) The dynamic information of the signature is compared with statistical and psychological information about signatures of the total population. Dynamic information which cannot be obtained with knowledge about the statistical properties of signatures and which is characteristic of the signer is classified as "secret."
(g) The binary representation of the feature is arranged in squares of edge length n, as shown in FIG. 4. The value of n plays no part for the discussion of the method. The greater n is, the lower the error rates corrected by the method are. The value of n is to be selected so that the method corrects the desired number of errors. It is selected on the basis of the variance possibly measured in step 1(d), statistical, psychological or other knowledge so as to correct the error rate expected within a user's measured biometric features. Different error rates can be assumed for different partial features. The length of the feature is not secret. If the last square cannot be filled completely, a rectangle can be used. Missing bits are filled with zeros.

(h) The parity is noted from each line and each column. That means 2n−1 independent values.
(i) The parities are stored for example in the apparatus according to the application. Although they could likewise be protected in principle, they will be regarded as public information in the following. This leaves (n−1)2 secret bits per square.
(j) In the last square the parities of several columns are combined so that the parities belong to constant column lengths.
(k) All signatures are deleted.
(l) For a suitable public-key method a key pair is generated.
(m) The secret key is protected with the aid of the binary representation of the feature, e.g. by storing the bit-by-bit XOR of the secret key with the biometric feature (or the hashed value thereof) and deleting the secret key.
(n) Statistical data on the total population to be regarded as commonly accessible are used to determine number N of the bits of the feature which are to be regarded as secret because they neither can be guessed nor are used up for error correction. Due to the error correction information the number of bits to be guessed in an attack can be reduced by 2n−1 per square since the attacker knows the correction method. The resulting number is a measure of the security of the method.
(o) All secret parts of the prototype of the signature are deleted.
(p) A key pair comprising a public and a secret key is generated.
(q) Value P and the private signature key are deleted.

2. Authentication Phase
(a) In an authentication phase the legitimate user signs on the display of an apparatus
(b) The signature is digitized with a suitable input device; static and dynamic information is detected. That can be in particular the same device as in the initialization phase.
(c) A hash value of the digitized signature is calculated. This can be compared in following authentication phases with the hash values of new signatures. Those digitized signatures are rejected which exactly match previously written signatures. This impedes replay attacks.
(d) Public information of the signature is used for classification purposes if the apparatus was initialized for several users.
(e) The binary representation of the feature is entered into the squares of the initialization phase.
(f) The parities of the lines and columns are calculated.
(g) Any one-bit errors are localized by comparison with the stored parities, and corrected. (See FIG. 4.)
(h) If there is more than one error in a square, correction fails. That is the case in particular if an insufficient forgery was inputted.
(i) The corrected feature is used for recovering the secret key of the public-key method. In the exemplary method from 1 (m) the bit-by-bit XOR of the feature (or hashed value) is calculated with the result of 1 (m). This value is the secret key.
(j) The document to be signed is signed by means of the newly generated private key.
(k) The private signature key is deleted.
(l) The signed document is transferred.
(m) The error correction function permits no conclusions on how far away the digitized biometric feature is from the boundary of the correction interval. Gradient methods are therefore not a suitable possibility of attack.

The invention claimed is:
1. A method for protecting data having an authentication phase comprising the following steps:
(a) providing a biometric feature;
(b) digitizing the biometric feature to create digitized biometric authentication feature data;
(c) recovering initialization biometric feature data measured in an initialization phase from said biometric authentication feature data on the basis of a coding-theory method within a freely selectable tolerance interval;
(d) decrypting an encrypted code word on the basis of the recovered initialization biometric feature data thereby obtaining a decrypted code word, and;
(e) recovering secret data from the decrypted code word;
wherein said encrypted code word is formed by digitizing a biometric feature to create a digital representation of the biometric feature, fault-tolerantly encoding and encrypting the secret data on the basis of the digital representation of the biometric feature.

2. The method according to claim 1 having an initialization phase comprising:
after providing a biometric feature, digitizing the biometric feature to create a digital representation of said biometric feature;
providing secret data;
encrypting on the basis of the digital representation of said biometric feature and fault tolerantly coding the secret data.

3. The method according to claim 2 including using the consecutive steps:
fault-tolerantly coding the secret data to create a code word;
encrypting the code word on the basis of the digital representation of said biometric feature to create an encrypted code word.

4. The method according to claim 3, wherein the code word is generated by a generating matrix.

5. The method according to claim 2 including the step of creating initial correction data to describe the space of allowed code words.

6. The method according to claim 2 including the step of providing initialization correction data on the basis of the digitized biometric feature data.

7. The method according to claim 2, including using user-specific initial correction data and/or user-specific fault-tolerant coding.

8. The method according to claim 2, wherein a public and a secret part are separated and determined or estimated from the biometric feature.

9. The method according to claim 8, wherein the separation into a public and a secret part of the biometric feature is effected with the aid of empirical inquiries.

10. The method according to claim 2, wherein a hash value is created from the digitized biometric feature data with the aid of a hash function.

11. The method according to claim 1 including the steps:
creating authentication correction data on the basis of the digitized biometric authentication feature data;
recovering the digitized biometric feature data on the basis of the authentication and initial correction data;
decrypting encrypted secret data on the basis of the recovered digitized biometric feature data.

12. The method according to claim 11, wherein the initial correction data are created by calculation of the digitized biometric feature data modulo n.

13. The method according to claim 11, wherein the authentication correction data are created by calculation of the authentication feature data modulo n.

14. The method according to claim 1, wherein a hash value is created from the digitized biometric authentication feature data with the aid of a hash function.

15. The method according to claim 1, wherein the biometric feature is a behavioral biometric.

16. The method according to claim 1, wherein the biometric feature consists of a handwritten signature.

17. The method according to claim 16, wherein the handwritten signature is broken down into a public and a secret part and the secret part is a proper subset of the dynamic information of the signature.

18. The method according to claim 1, wherein the providing and/or digitizing of the biometric feature is effected several times.

19. The method according to claim 1, wherein the secret data are generated with a public-key method.

20. An apparatus for protecting data, comprising:
digitizing apparatus arranged to digitize a biometric feature to thereby create a digitized biometric authentication feature data;
a secret data generator comprising;
apparatus arranged to fault-tolerantly code and decode the secret data; and
encrypting and decrypting apparatus arranged to encrypt and decrypt the fault-tolerantly coded secret data with the aid of the digitized biometric authentication feature data;
wherein an initialization biometric feature data measured in an initialization phase is recovered from said biometric authentication feature data on the basis of a coding-theory method within a freely selectable tolerance interval, and an encrypted code word is decrypted on the basis of the recovered initialization biometric feature data, thereby obtaining a decrypted code word and;
whereby the secret data is recovered from the decrypted code.

21. The apparatus according to claim 20 including apparatus arranged to create code words.

22. The apparatus according to claim 20 including apparatus arranged to create initial correction data.

23. The apparatus according to claim 20 including apparatus arranged to provide a hash value.

24. The apparatus according to claim 20 including apparatus arranged to break down the biometric feature into a public and a secret part.

25. The apparatus according to claim 24 wherein the apparatus arranged to break down into a public and a secret part the biometric feature is further arranged to do so with the aid of statistical inquiries.

26. The apparatus according to claim 20, including apparatus arranged to capture a handwritten signature as a biometric feature.

* * * * *